(12) United States Patent
Oota et al.

(10) Patent No.: US 7,844,377 B2
(45) Date of Patent: Nov. 30, 2010

(54) IN-VEHICLE COMMUNICATION SYSTEM, ON-BOARD TERMINAL, PORTABLE DEVICE, AND IN-VEHICLE COMMUNICATION METHOD

(75) Inventors: Mitsuru Oota, Hyogo (JP); Tetsuya Nomura, Hyogo (JP); Satoshi Harumoto, Hyogo (JP); Yuusaku Matsuda, Hyogo (JP); Yasushi Seike, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 349 days.

(21) Appl. No.: 11/452,314

(22) Filed: Jun. 14, 2006

(65) Prior Publication Data

US 2007/0038344 A1    Feb. 15, 2007

(30) Foreign Application Priority Data

Aug. 11, 2005  (JP) .............................. 2005-233557

(51) Int. Cl.
*G06F 7/00* (2006.01)
*G06F 17/00* (2006.01)
(52) U.S. Cl. .................. 701/49; 701/1; 701/2; 701/36; 701/200; 340/425.5; 340/426.1; 340/426.13; 340/426.14; 340/426.15; 340/426.16; 340/426.17; 340/426.18; 340/426.22; 340/426.23; 340/426.27; 340/426.28; 340/426.29; 340/426.35; 340/426.36; 340/539.11; 340/539.13; 340/539.23
(58) Field of Classification Search .............. 701/1, 701/2, 36, 49, 200; 340/425.5, 426.1, 426.13–426.36, 340/539.11, 539.13, 539.23
See application file for complete search history.

(56) References Cited

U.S. PATENT DOCUMENTS

| 4,673,921 | A | * | 6/1987 | Saito et al. ............. 340/539.32 |
| 5,736,935 | A | * | 4/1998 | Lambropoulos ....... 340/825.69 |
| 6,034,617 | A | * | 3/2000 | Luebke et al. .............. 340/5.62 |
| 6,522,029 | B1 | * | 2/2003 | Bell et al. .................. 307/10.6 |
| 2004/0036625 | A1 | * | 2/2004 | Omata et al. ........... 340/825.69 |
| 2004/0075532 | A1 | * | 4/2004 | Ueda et al. ................. 340/5.72 |
| 2004/0227639 | A1 | | 11/2004 | Masui |
| 2005/0024181 | A1 | * | 2/2005 | Hofbeck et al. .............. 340/5.7 |
| 2005/0099263 | A1 | * | 5/2005 | Ikeda ........................ 340/5.62 |

(Continued)

FOREIGN PATENT DOCUMENTS

JP           04-058029           2/1992

(Continued)

OTHER PUBLICATIONS

Office Action issued in JP Application No. 2005-233557 on Jul. 20, 2010 (with English translation).

*Primary Examiner*—Jack Keith
*Assistant Examiner*—Chuong P Nguyen
(74) *Attorney, Agent, or Firm*—Oliff & Berridge, PLC

(57) ABSTRACT

Current position of a vehicle and current time are acquired. A user recognizing unit recognizes a user. A pattern recognizing unit detects location of a portable device and movement thereof. Operation state of an engine is acquired from an engine control mechanism. Based on the information, processes are performed such as switching communication stand-by mode of the portable device to active stand-by mode, notifying the portable device of a transition of an on-board terminal to automatic locking mode, preventing needless unlocking and locking of doors, and setting warning mode of the portable device.

22 Claims, 7 Drawing Sheets

U.S. PATENT DOCUMENTS

2005/0134477 A1* 6/2005 Ghabra et al. .......... 340/825.72
2005/0141470 A1* 6/2005 Jung et al. .................. 370/338
2005/0237152 A1* 10/2005 Nakashima et al. ........ 340/5.65

FOREIGN PATENT DOCUMENTS

| JP | A 10-292700 | 11/1998 |
| --- | --- | --- |
| JP | 11-280316 | 10/1999 |
| JP | A 2000-145223 | 5/2000 |
| JP | A 2001-40921 | 2/2001 |
| JP | A 2001-115700 | 4/2001 |
| JP | A 2004-25938 | 1/2004 |
| JP | 2004-068421 | 3/2004 |
| JP | A 2004-219373 | 8/2004 |
| JP | A 2004-339700 | 12/2004 |
| JP | A 2005-9200 | 1/2005 |
| JP | 2005-146666 | 6/2005 |
| JP | A 2005-163522 | 6/2005 |
| WO | WO 02100666 | * 12/2002 |

* cited by examiner

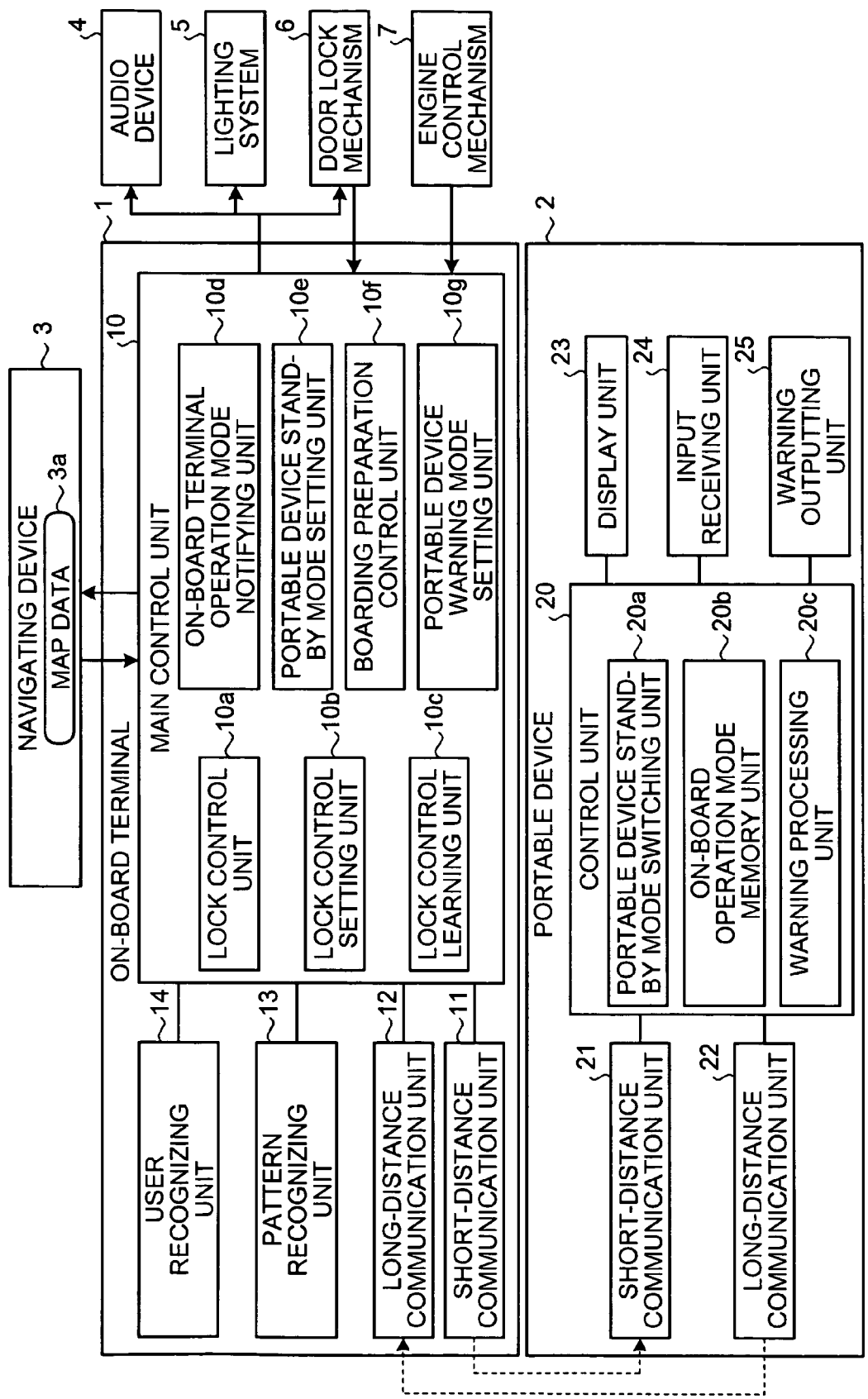

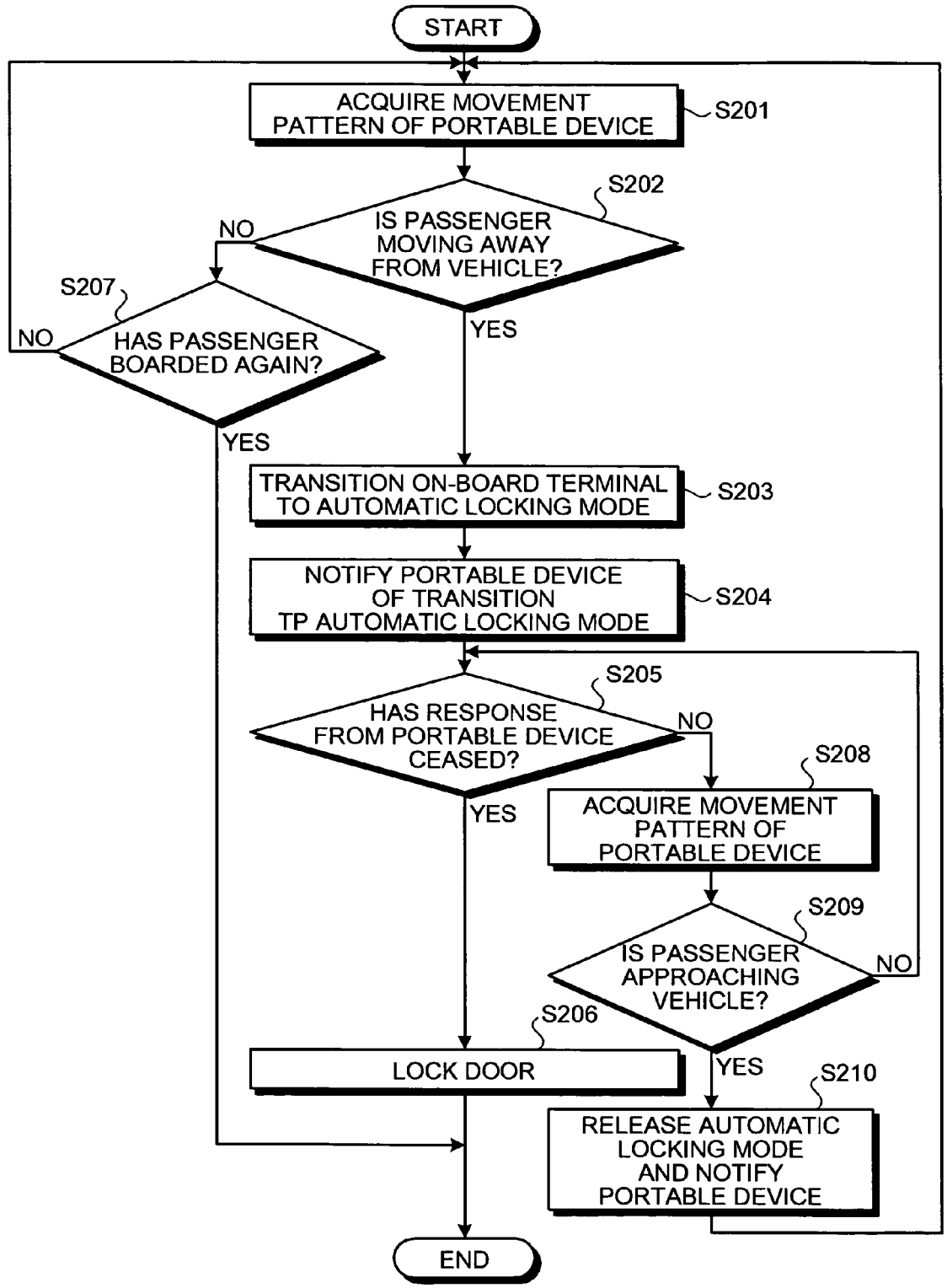

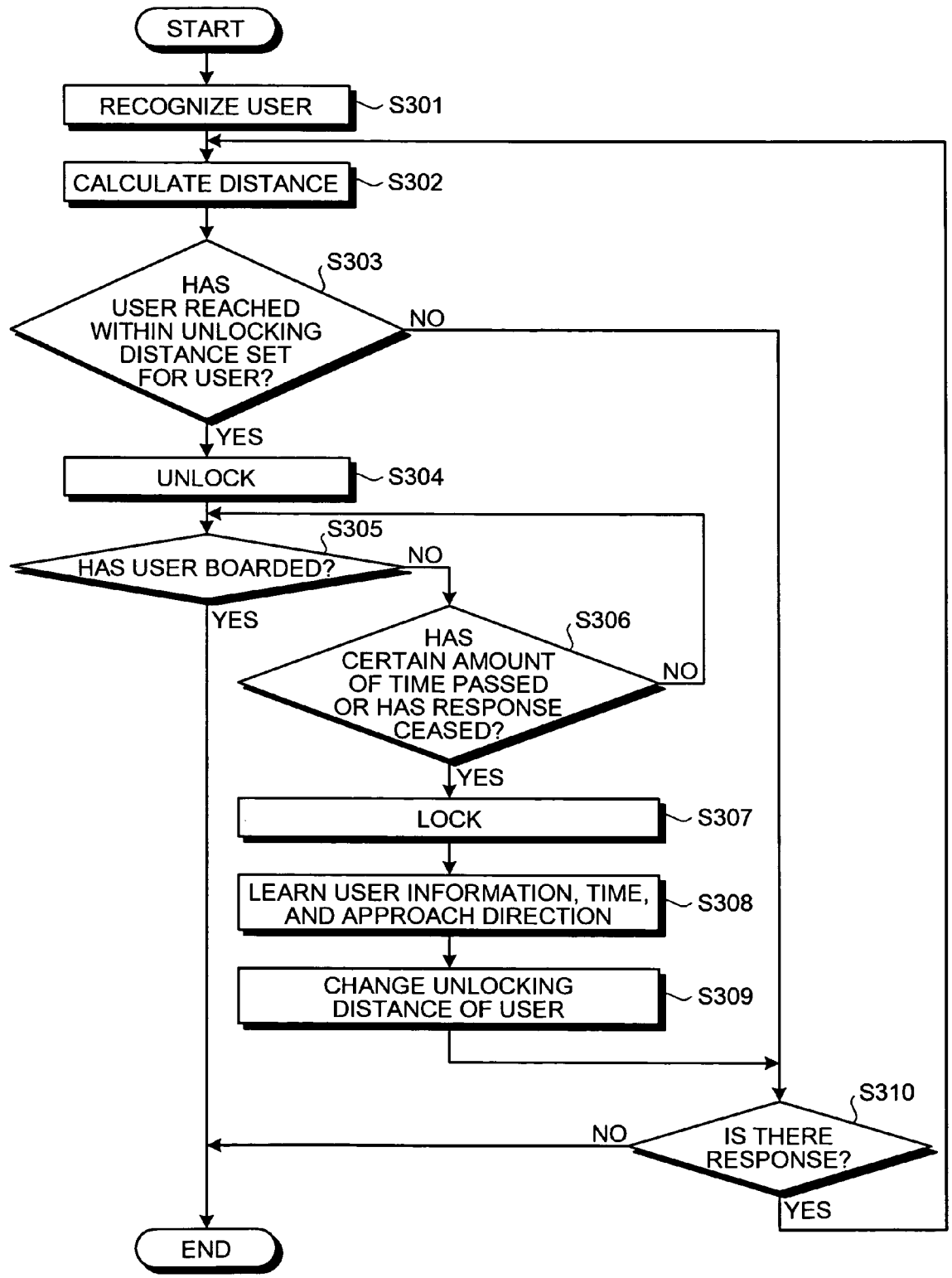

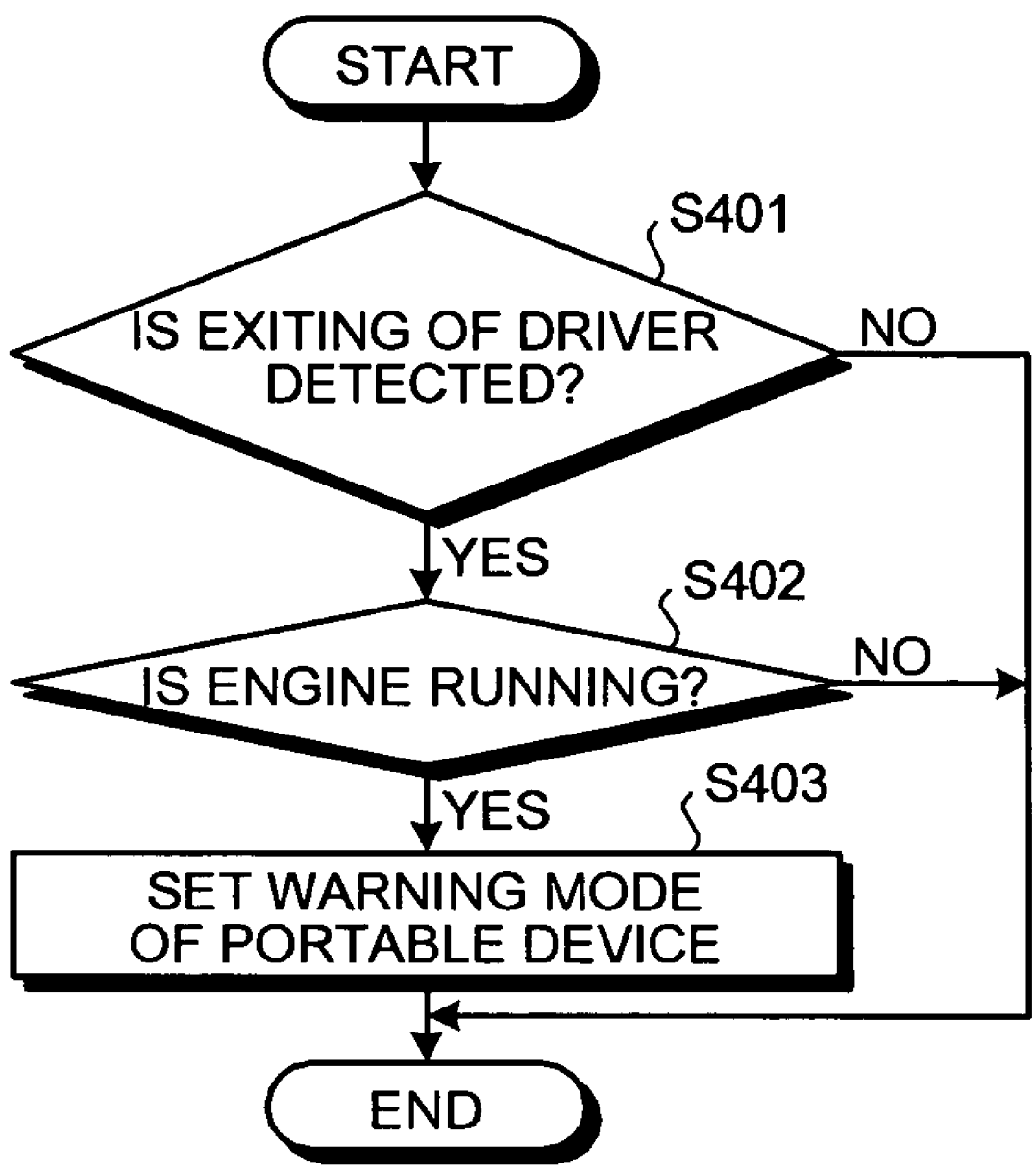

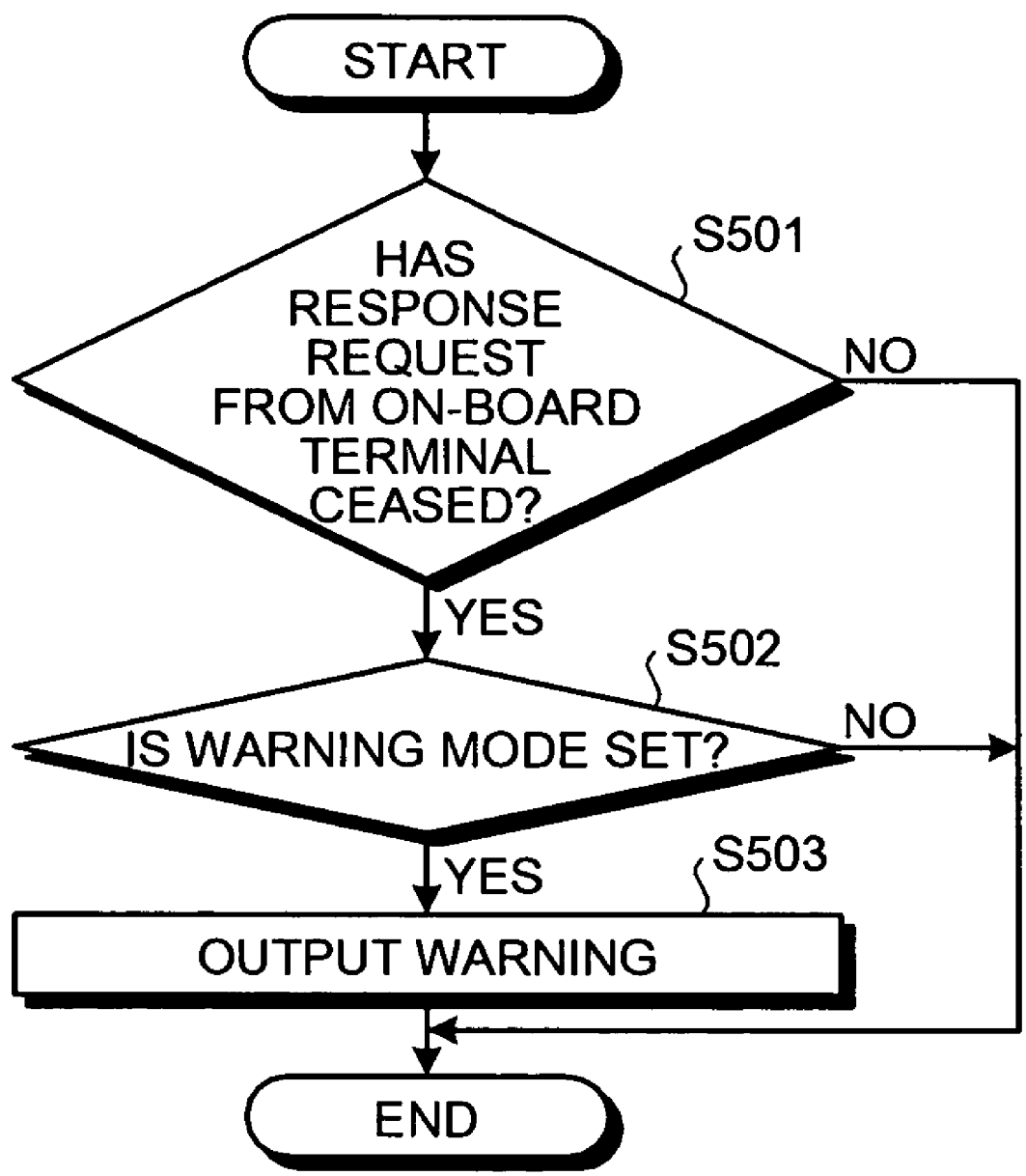

IN-VEHICLE COMMUNICATION SYSTEM, ON-BOARD TERMINAL, PORTABLE DEVICE, AND IN-VEHICLE COMMUNICATION METHOD

BACKGROUND OF THE INVENTION

1. Field of the Invention

The present invention relates to a technology for remotely controlling a vehicle based on a communication between a portable device held by a passenger and an on-board terminal installed in a vehicle.

2. Description of the Related Art

In recent years, an in-vehicle system has been proposed in which doors of a vehicle are locked and unlocked through communication with a portable device. This system is referred to as a keyless entry system or a smart entry system. In some keyless entry systems, in addition to a configuration in which locking and unlocking are performed when a user (a passenger outside of the vehicle) operates the portable device, a configuration in which locking and unlocking are performed automatically depending on a distance between the portable device and the on-board terminal is also provided.

Reduction of power consumption of the portable device is an important issue. A keyless entry system disclosed in Japanese Laid-open Patent Publication No. 2000-145223, for example, determines a distance between the portable device and the on-board terminal from positional information of the portable device and positional information of the on-board terminal and changes the power consumption of the portable device depending on the distance.

Furthermore, a smart entry system disclosed in Japanese Laid-open Patent Publication No. 2001-40921 lengthens transmission period of a response request from the on-board terminal to a portable device depending on the amount of time a driver is in a transmission and reception coverage area of the vehicle when exiting the vehicle.

In the conventional technologies, first, an on-board terminal transmits a query signal to a portable device, and the portable device returns back a response signal only upon receiving the query signal. Inductive communication having a short range, which requires less stand-by power consumption, is used for communication from the on-board terminal to the portable device and radio communication having a long range is used for communication from the portable device to the on-board terminal thereby reducing overall power consumption.

However, because the inductive communication is limited to a narrow range, the on-board terminal can communicate with the portable device only when the portable device is in the range. In addition, the door is locked when the portable device moves out of the inductive communication range (i.e., when there is no response from the portable device), and thus, the on-board terminal cannot provide information to the portable device thereafter.

However, when the vehicle is parked in a wide area such as a parking area of a store, for example, preparations for boarding are preferably made in advance by detection of the passenger from a relatively far distance. On the other hand, when the vehicle is parked in the narrow area such as a home garage, the portable device may enter the inductive communication range and the door may be unintentionally unlocked because the user, who can be the driver or the possessor of the vehicle, or just a passenger, passes near the vehicle for reasons other than to board the vehicle.

In addition, the portable device cannot be notified that the door has been locked because the door is locked when the portable device moves out of the inductive communication range, and thus, the user cannot confirm that the door has been locked.

In other words, the state of the vehicle is unknown at the portable device side, and therefore, the portable device cannot give notifications to the user autonomously.

For example, if the user holding the portable device moves away from the vehicle while the engine is running or when the door lock is unlocked and the engine is stopped or the door is locked thereafter, other users cannot restart the vehicle because they does not have the portable device. Conventionally, the vehicle gives out a warning by sounding a horn, etc., to prevent such situations from occurring. However, the user does not always take notice of the warning, and furthermore, the warning becomes a nuisance if the user is intentionally moving away from the vehicle while the engine is running. Regardless of there being situations as such, in which warnings are preferably given by the portable device, these situations were not taken into consideration in the conventional technologies.

In other words, in the conventional technologies, the operations of the portable device and the on-board terminal are fixed. Thus, there is need of a technology that performs appropriate operation according to the situation cannot be performed.

SUMMARY OF THE INVENTION

It is an object of the present invention to at least partially solve the problems in the conventional technology.

According to an aspect of the present invention, an in-vehicle communication system including an on-board terminal arranged on a vehicle; a portable device that can be inside or outside of the vehicle; an information acquiring unit that acquires vehicle information indicative of a state of the vehicle; and an operation mode changing unit that changes an operation mode of at least one of the portable device and the on-board terminal based on the vehicle information.

According to another aspect of the present invention, an on-board terminal arranged on a vehicle and that performs bi-directional communication with a portable device that can be inside or outside of the vehicle includes a position information acquisition unit that acquires position information indicative of current position of the vehicle; and an operation mode changing unit that changes communication stand-by mode of the portable device based on the position information.

According to still another aspect of the present invention, an on-board terminal arranged on a vehicle and that performs bi-directional communication with a portable device that can be inside or outside of the vehicle including an information acquisition unit that acquires state information indicative of at least one of an operation state of an engine of the vehicle and lock status of a door of the vehicle; and a warning mode setting unit sets a warning mode of the portable device based on the state information.

According to still another aspect of the present invention, a portable device that can be inside or outside of a vehicle and that performs bi-directional communication with an on-board terminal arranged on the vehicle including a passive stand-by mode unit that transmits a response signal to the on-board terminal upon receiving a response request from the on-board terminal; and an active stand-by mode unit that transmits a notification signal to the on-board terminal at regular intervals.

According to still another aspect of the present invention, a portable device that can be inside or outside of a vehicle and that performs bi-directional communication with an on-board terminal arranged on the vehicle including a warning mode that is controlled and set by the on-board terminal; and a warning output unit set the warning mode, receives signals from the on-board terminal, and outputs a warning if no signal is received from the on-board terminal while the warning mode is set.

According to still another aspect of the present invention, a method of performing bi-directional communication between an on-board terminal arranged on a vehicle and a portable device that can be inside or outside of the vehicle includes acquiring vehicle information indicative of a state of the vehicle; and changing an operation mode of at least one of the portable device and the on-board terminal based on the vehicle information acquired at the acquiring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an in-vehicle communication system according to an embodiment of the present invention;

FIG. 4 is a flowchart of a process performed by the on-board terminal when a passenger is exiting the vehicle;

FIG. 5 is a flowchart of a process performed by the on-board terminal when the vehicle is parked in a home garage;

FIG. 6 is a flowchart of a portable device warning mode setting performed by the on-board terminal; and FIG. 7 is a flowchart of a warning processing performed by the portable device.

DETAILED DESCRIPTION OF THE PREFERRED EMBODIMENTS

Figure 2A:
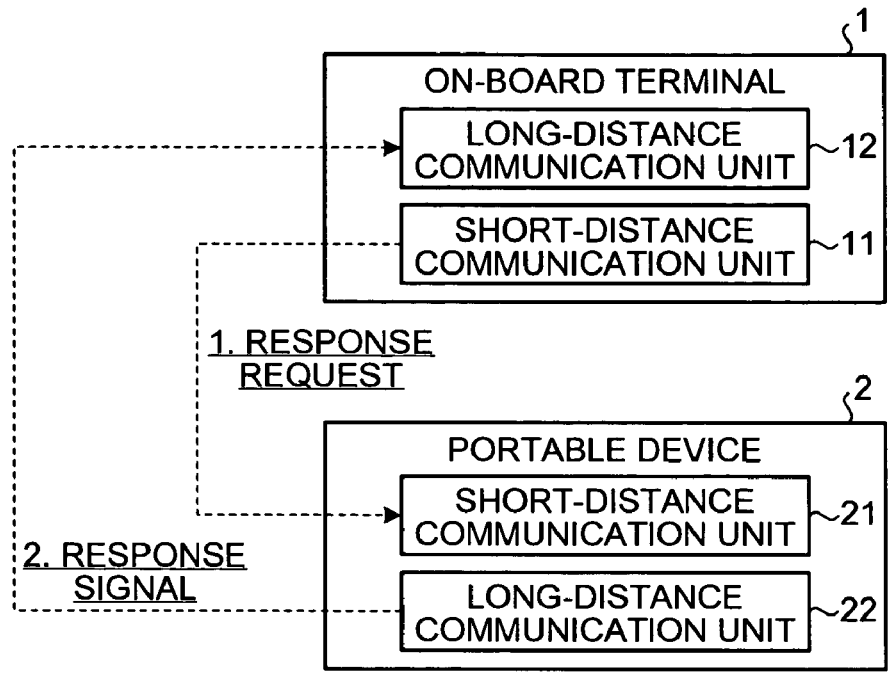
FIG. 2A is a schematic for explaining an operation in which an on-board terminal transmits a response request.

Exemplary embodiments of the present invention are below described with reference to the attached drawings.

FIG. 1 is a block diagram of an in-vehicle communication system according to an embodiment of the present invention. The in-vehicle communication system includes an on-board terminal 1 and a portable device 2. The on-board terminal 1 is connected to a navigating device 3, an audio device 4, a lighting system 5, a door locking mechanism 6, an engine controlling mechanism 7, etc that are generally present in a vehicle.

The navigating device 3 is an on-board device that sets a travel path and performs guidance using the current location of the vehicle and map data 3a. The current location of the vehicle is determined by communicating with a global positioning system (GPS) satellite.

The audio device 4 is an on-board device that reads and reproduces content information recorded onto various recording media, such as compact disk (CD), digital versatile disk (DVD), hard disk (HD), and also receives and reproduces television broadcast and radio broadcast. The lighting system 5 includes various lighting equipment, such as headlights, turn signal lamps, and cornering lamps, installed in the vehicle. The door locking mechanism 6 is a mechanism that locks doors of the vehicle. The engine controlling mechanism 7 is a mechanism that controls engine operation and notifies the on-board terminal 1 of engine operation state.

The on-board terminal 1 includes a main control unit 10, a short distance communication unit 11, a long distance communication unit 12, a pattern recognizing unit 13, and a user recognizing unit 14. The short distance communication unit 11 communicates with the portable device 2 by a communication system using mutual induction (inductive communication) and it covers only a shorter distance. The long distance communication unit 12 communicates with the portable device 2 by a communication system using radio waves (radio communication) and it covers a longer distance than that covered by the short distance communication unit 11.

The pattern recognizing unit 13 recognizes the movement pattern of the portable device 2. Specifically, relative position of the portable device 2 with respect to the on-board terminal 1 and the transition thereof can be calculated using triangulation of radio waves outputted from the portable device 2, or the transition of the relative distance can be determined from changes in the strength of the radio waves outputted from the portable device 2.

The user recognizing unit 14 recognizes a user that is holding the portable device 2. Specifically, a different portable device can be assigned to each user of the vehicle and a user can be recognized by identification of the portable device, or the user can be recognized by using the technique of image processing. On the other hand, the user recognizing unit 14 can be configured so that the user is recognized based on data input by the user.

The main control unit 10 performs overall control of the on-board terminal. The main control unit 10 includes a lock control unit 10a, a lock control setting unit 10b, a lock control learning unit 10c, an on-board terminal operation mode notifying unit 10d, a portable device stand-by mode setting unit 10e, a boarding preparation control unit 10f, and a portable device warning mode setting unit 10g.

The lock control unit 10a controls the door locking mechanism 6 and locks and unlocks the doors. Specifically, when a locking instruction or an unlocking instruction is received from the portable device 2, the lock control unit 10a locks and unlocks the doors according to the instruction. In addition, the lock control unit 10a locks the door when the user moves away from the vehicle and unlocks the door when the user approaches the vehicle.

The lock control setting unit 10b performs processing to change the operation mode of the lock control unit 10a. Specifically, the lock control setting unit 10b transitions the lock control unit 10a to automatic locking mode when the passenger is moving away from the vehicle, based on the output from the pattern recognizing unit 13.

In addition, when the positional information outputted from the navigating device 3 indicates that the current location of the vehicle is the user's home, the lock control setting unit 10b changes the unlocking operation mode of the lock control unit 10a to an operation mode for the home.

When the vehicle is parked at the user's home, the portable device may enter the inductive communication range and the doors may be needlessly unlocked because the user passes near the vehicle for reasons other than to board the vehicle. Thus, the conditions for unlocking are made stricter in the unlocking operation mode for home, and furthermore, the lock control learning unit 10c learns the approaching and boarding histories of the user and the unlocking conditions are adjusted.

The on-board terminal operation notifying unit 10d notifies the portable device 2 of the transition to automatic locking mode when the lock control setting unit 10*b* transitions the operation mode of the lock control unit 10*a* to automatic locking mode.

The portable device stand-by mode setting unit 10*e* performs processing to change the communication stand-by mode of the portable device 2 based on the positional information of the vehicle. Specifically, the portable device stand-by mode setting unit 10*e* switches the communication stand-by mode of the portable device 2 to active stand-by mode when the positional information indicates that the current location of the vehicle is a store.

Ordinarily, the portable device 2 stands by for communication in passive stand-by mode, in which a response signal is transmitted when a response request from the on-board terminal 1 is received. However, in active stand-by mode, the portable device 2 transmits a notification signal to the on-board terminal 1 at a regular interval. The communication range from the portable device 2 to the on-board terminal 1 is greater than the communication range from the on-board terminal 1 to the portable device 2. Therefore, the approach of the portable device can be detected earlier (from a farther distance) when the portable device is in active stand-by mode than in passive stand-by mode.

The boarding preparation control unit 10*f* performs preparations for boarding when an approaching portable device 1, namely an approaching passenger, is detected. Specifically, preparations are made, such as controlling the audio device 4 and playing predetermined music; controlling the lighting system 5, and giving notification of the location of the vehicle and lighting the foot area of the passenger; and activating the navigating device 3 in advance.

The portable device warning mode setting unit 10*g* performs processing to configure a warning mode setting of the portable device 2 based on the state of the vehicle. Specifically, the warning mode of the portable device 2 is set when the driver exits the vehicle while the engine is running or when the driver exits the vehicle while the door lock is released.

The portable device 2 includes a control unit 20, a short-distance communication unit 21, a long-distance communication unit 22, a display unit 23, an input receiving unit 24, and a warning outputting unit 25. The short-distance communication unit 21 communicates with the on-board terminal 1 by a communication system using mutual induction (inductive communication). The long-distance communication unit 22 communicates with the on-board terminal 1 by a communication system using radio waves (radio communication).

The display unit 23 is an output interface for displaying and outputting indicators, displays, etc. The input receiving unit 24 for receiving input by operation input, through a switch or the like, by the user. The warning outputting unit 25 outputs a warning to the user holding the portable device 2, by a buzzer sound, LED, vibrations, etc.

The control unit 20 performs overall control of the portable device 20. For example, when the user performs an input requesting locking or unlocking via the input receiving unit 24, the locking instruction or the unlocking instruction is sent to the long-distance communication unit 22.

The control unit 20 includes a portable device stand-by mode switching unit 20*a*, an on-board operation mode memory unit 20*b*, and a warning processing unit 20*c*. The portable device stand-by mode switching unit 20*a* is controlled by the portable device stand-by mode setting unit 10*e* of the on-board terminal 1 and performs processing to switch the communication stand-by mode of the portable device 2 between active stand-by mode and passive stand-by mode.

The on-board terminal operation mode memory unit 20*b* receives notification from the on-board terminal operation mode notifying unit 10*d* and stores the transition of the on-board terminal 1 into automatic lock mode. Thus, the control unit 20 can display the operation mode of the on-board terminal 1 in the display unit 23 as required.

The warning processing unit 20*c* outputs a warning output from the warning outputting unit 25 when the response request from the on-board terminal 1 ceases while the warning mode is set by the warning mode setting unit 10*e* of the on-board terminal 1. In addition, information can also be provided at this time using the display unit 23.

Next, an operation of the in-vehicle communication system is explained. In normal operation, when the passenger (user) is outside of the vehicle, the on-board terminal 1 transmits a response request to the portable device 2, and the portable device 2 transmits a response signal only when the response request is received. The passive stand-by mode is when the portable device 2 transmits the response signal only when the response request is received, as such.

The on-board terminal 1 transmits the response request using a short-distance communication unit 11, namely inductive communication. The portable device 2 transmits the response signal using a long-distance communication unit 12, namely radio communication.

Inductive communication has a short communication range of 2 meters to 3 meters but can significantly reduce power consumption. On the other hand, radio communication consumes more power than inductive communication but has a communication range of about 10 meters to 15 meters.

To enhance the lifespan of the portable device 2, power consumed by the portable device 2 during communication stand-by is reduced by the use of inductive communication for communication from the on-board terminal 1 to the portable device 2. In addition, power required for transmission is reduced by the performance of transmission only when responding to a response request from the on-board terminal 1.

However, if the response signal is only transmitted when the response request transmitted by inductive communication as such is received, when the user holding the portable device 2 approaches the vehicle, the approach of the user is detected only after the user has moved into the communication range of inductive communication.

In other words, the passenger is detected only after reaching a distance of 2 to 3 meters from the vehicle. Thus, services that can be performed from when the user is detected until the user boards the vehicle is limited. For example, the navigating device 3 requires time for activation. Therefore, even if activated when the user has reached a distance of 2 to 3 meters from the vehicle, the navigating device 3 cannot reach a state allowing destination setting and the like by the time the user boards the vehicle.

In addition, when performing services such as activating the audio device 4 and playing music as desired by the user or services such as controlling the lighting system 5 and notifying the user of the location of the vehicle by flashing the turn signal lamps or lighting the foot area of the user using the cornering lamps, the user must be detected before he reaches the communication range of inductive communication.

Figure 2B:
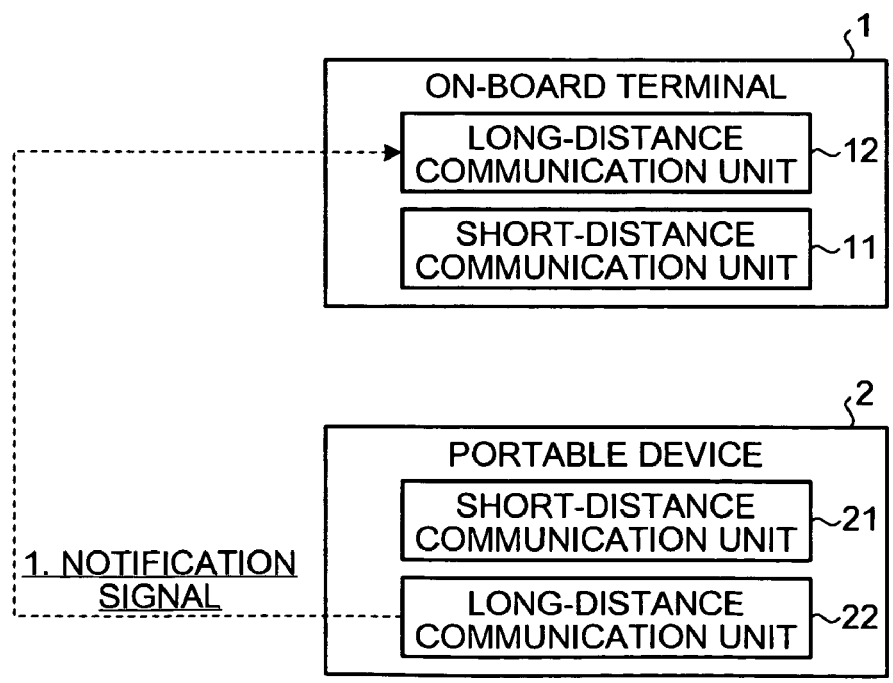
FIG. 2B is a schematic for explaining an operation in which a portable device transmits a notification signal.

Therefore in the in-vehicle communication system, the portable device 2 transmits a notification signal to the on-board terminal 1 at a regular interval, as shown in FIG. 2, when predetermined conditions are met, such as the current location of the vehicle being a parking area of a store.

The notification signal is transmitted by inductive communication using the long-distance communication unit 12.

Thus, the on-board terminal 1 can detect the approach of the portable device 2 at an early stage, namely within the communication range of the radio communication. The active standby mode is when the portable device 2 transmits a notification signal at a regular interval, as such.

Figure 3:
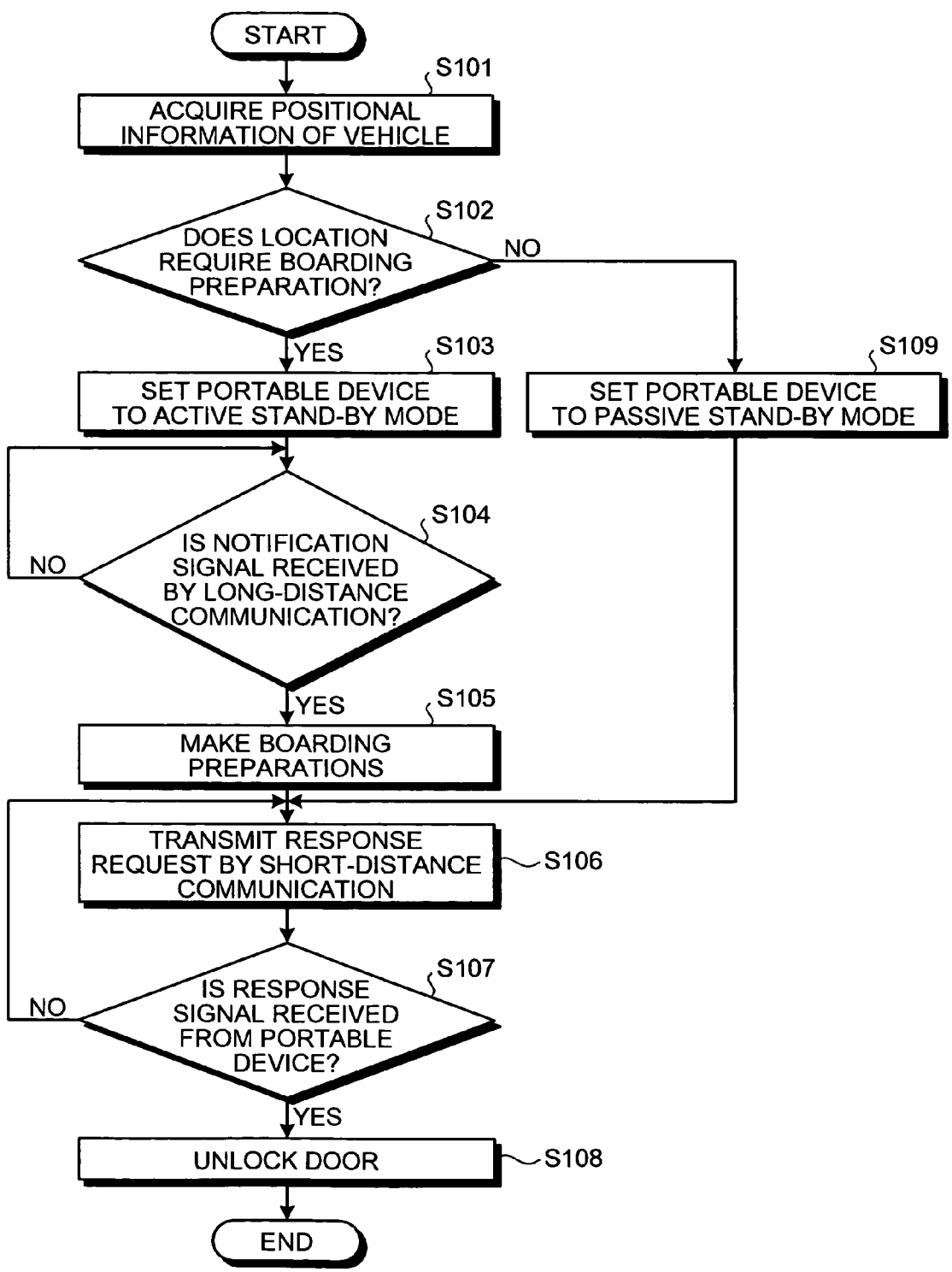
FIG. 3 is a flowchart of a process performed by the on-board terminal when a passenger is outside of a vehicle.

The processing operation of the on-board terminal 1 when the user is outside of the vehicle is explained with reference to the flow chart in FIG. 3. As shown in this diagram, the on-board terminal 1 first acquires positional information of the vehicle from the navigating device 3 (Step S101).

Then, whether the vehicle is in a location requiring boarding preparations (for example, a predetermined location such as a parking area of a store) is judged from the acquired positional information (Step S102). If the vehicle is in a location that does not require boarding preparations (Step S102, No), the portable device standby mode setting unit 10e sets the portable device 2 to passive stand-by mode (Step S109).

At the same time, if the location requires boarding preparations (Step S102, Yes), the portable device stand-by mode setting unit 10e sets the portable device 2 to active stand-by mode (Step S103) and monitors whether the long-distance communication unit 12 receives a notification signal from the portable device 2 (Step S104).

If the long distance communication unit 12 receives a notification signal form the portable device 2 (Step S104, Yes), the boarding preparation control unit 10f performs boarding preparations, such as activating the navigating device 3, playing music from the audio device 4, and giving notification of the vehicle location and lighting the foot area by the lighting system 5 (Step S105).

After the boarding preparations (Step S105) are completed or when the portable device 2 is in passive stand-by mode (Step S109), the short-distance communication unit 11 of the on-board terminal 1 transmits a response request by inductive communication (Step S106) until a response signal is received from the portable device 2 (Step S107, Yes).

Then, when the response signal is received from the portable device 2 (Step S107, Yes), the lock control unit 10a controls the door locking mechanism 6 and unlocks the door (Step S108), and the process is completed.

Next, an operation when the passenger exits the vehicle is explained. As explained earlier, when the portable device 2 moves out of the inductive communication range, namely when the response signal from the portable device 2 to the response request ceases, and the lock control unit 10a locks the door, communication from the on-board terminal 1 to the portable device 2 cannot be performed once the locking is completed. Thus, the on-board terminal 1 cannot notify the portable device 2 of lock-completion.

Therefore, the on-board terminal 1 recognizes the movement pattern of the portable device 2 and moves the lock control unit 10a to an automatic locking mode when the passenger is moving away from the vehicle. The on-board operation mode notification unit 10 notifies the portable device 2 of the transition to automatic locking mode.

The portable device 2 stores the operation mode of the on-board terminal 1 in the on-board operation mode memory unit 20b. Thus, even if the distance between the portable device 2 and the on-board terminal 1 becomes greater than the inductive communication range and mutual communication with the on-board terminal 1 becomes impossible, the user can confirm that the on-board terminal 1 is in "automatic lock mode" by the display output of the portable device 2.

A processing operation of the on-board terminal 1 when the user exits the vehicle is explained with reference to the flowchart in FIG. 4. As shown in the diagram, the on-board terminal 1 recognizes the movement pattern of the portable device 2 by the pattern recognizing unit 13 (Step S201).

Then, whether the passenger is moving away from the vehicle is judged from the acquired movement pattern (Step S202). If the passenger is moving away from the vehicle (Step S202, Yes), the on-board terminal 1 enters automatic locking mode (Step S203), and the portable device 2 is notified that the on-board terminal 1 has transitioned to automatic locking mode (Step S204).

Subsequently, the short-distance communication unit 11 transmits the response request to the portable device 2 at a regular interval. When the response from the portable device 2 ceases (Step S205, Yes), the door is locked (Step S206) and the process is completed.

When there is response from the portable device 2 (Step S205, No), the movement pattern of the portable device 2 is acquired again by the pattern recognizing unit 13 (Step S208), and whether the passenger is approaching the vehicle is judged (Step S209).

If the passenger is not approaching the vehicle (Step S209, No), the process control is returned to Step S205 again. On the other hand, if the passenger is approaching the vehicle (Step S209, Yes), the automatic locking mode is released, notification is given to the portable device (Step S210), and the process control is shifted to Step S201.

When the passenger is not moving away from the vehicle (Step S202, No), the on-board terminal 1 judges whether the passenger has boarded the vehicle again (Step S207). If the passenger has not boarded the vehicle (Step S207, No), the process proceeds to Step S201 again. If the passenger has boarded the vehicle again (Step S207, Yes), the process is completed.

Next, an unlocking operation mode for home of the lock control unit 10a is explained. As explained earlier, when the vehicle is parked at the user's home, the portable device may enter the inductive communication range and the doors may be needlessly unlocked because the user passes near the vehicle for reasons other than to board the vehicle.

Therefore, the lock control setting unit 10b transitions the lock control unit 10a to the unlocking operation mode for home when the positional information acquired from the navigating device 3 indicates that the current location of the vehicle is the user's home.

The unlocking operation mode for home has strict unlocking conditions. Furthermore, in the unlocking operation mode for home, the lock control learning unit 10c learns the approaching and boarding histories of the user, and the unlocking conditions are adjusted. Specifically, the approach of the user is detected while the vehicle is parked at home. If the passenger does not board the vehicle, the lock control learning unit 10c learns the time period, approach direction, and user information, and the unlocking conditions for the user becomes stricter.

For example, if the door is unlocked when an "unlocking distance" is set for each user as an unlocking condition and the distance between the portable device 2 and the on-board terminal 1 is within the unlocking distance, the condition is made stricter by shortening the unlocking distance for users that do not board the vehicle regardless of approaching the vehicle.

The unlocking distance is preferably set for each approach direction, as well. For example, the user will never board the vehicle when he is approaching the vehicle from within the house, from the direction of a wall or a window, and thus, the unlocking distance for this approach direction is shortened.

When the user approaches the vehicle from the front door, the unlocking distance for this approach direction should be set longer.

Similarly, whether to unlock the door in correspondence to the living habits of the user by changing the unlocking distance according to time, to correspond with nighttime and daytime, departure time, and the like can be judged.

A processing operation of the on-board terminal 1 when the vehicle is parked at home is explained with reference to the flowchart in FIG. 5. As shown in the diagram, the on-board terminal 1 first recognizes the user by the user recognizing unit 14 (Step S301) and calculates the distance to the portable device 2 by the pattern recognizing unit 13 (Step S302).

Then, whether the portable device 2 has reached the unlocking distance set for the user is judged (Step S303). If the portable device 2 has reached the unlocking distance (Step S303, Yes), the door is unlocked. Then, whether the user has boarded the vehicle is judged (Step S305). If the user has boarded the vehicle (Step S305, Yes), the process is completed.

On the other hand, if the user does not board the vehicle (Step S305, No), a certain amount of time passes or whether response from the portable device 2 has ceased is judged (Step S306). If there is response from the portable device 2 and a certain amount of time has not passed, (Step S306, No), the process proceeds to step S305, again.

At the same time, if a certain amount of time passes or the response from the portable device 2 ceases (Step S306, Yes), the lock control unit 10a locks the door (Step S307), the lock control learning unit 10c learns user information, time, and approaching direction (Step S308) and changes the unlocking distance of the user (Step S309).

After the unlocking distance is changed (Step S309), or when the portable device 2 does not reach the unlocking distance set for the user (Step S303, No), a response request is transmitted to the portable device 2, and whether the portable device 2 responds is judged. If the portable device 2 has responded (Step S310, Yes), the process proceeds to distance calculation again (Step S301). If the portable device 2 does not respond (Step S310, No), the process is completed.

Next, the warning mode setting of the portable device 2 by the portable device warning mode setting unit 10g of the on-board terminal 1 is explained with reference to the flowchart in FIG. 6. As shown in the diagram, the portable device warning mode setting unit 10g first judges whether the driver has exited the vehicle based on the result of recognition from the pattern recognizing unit 13 (Step S401).

If it is detected that the user has exited the vehicle (Step S401, Yes), whether the engine is running is judged next based on the output of the engine control unit 7 (Step S402).

Then, if the engine is running (Step S402, Yes), the warning mode of the portable device 2 is set (Step S403) and the process is completed. On the other hand, if it is not detected that the driver has exited the vehicle, (Step S401, No) or if the engine is stopped (Step S402), the process is completed.

Although an example of an instance in which the warning mode is set when the engine is running is explained above, the a processing flow can be easily prepared when other conditions, such as when the door lock is released, are to be taken into consideration.

Next, the warning output by the portable device 2 is explained with reference to the flowchart in FIG. 7. As shown in the diagram, a warning processing unit 20c first judges whether the response request from the on-board terminal 1 has ceased (Step S501).

If the response request from the on-board terminal 1 has ceased (Step S501, Yes), whether the warning mode is set is judged (Step S502). Then, if the warning mode is set (Step S502, Yes), the warning outputting unit 25 outputs the warning (Step S503) and completes processing.

On the other hand, if the response request from the on-board terminal 1 has ceased (Step S501, No) or if the warning mode is not set (Step S502, No), the processing is completed.

As explained above, the operation state can be changed according to the situation because the on-board terminal 1 performs processes such as switching the communication stand-by mode of the portable device 2 to active stand-by mode, notifying the portable device 2 of the transition of the on-board terminal 1 to automatic locking mode, and reducing needless locking and unlocking at home, based on the positional information and time information of the vehicle and the movement patterns of the portable device 2.

In addition, the portable device 2 can autonomously give out warnings and notifications to the user because the on-board terminal 1 sets the warning mode of the portable device based on the state of the vehicle, such as the operation state of the engine and the door lock status.

According to an aspect of the present invention, an in-vehicle communication system can change the operation state according to the situation. Moreover, the operation state can be changed according the location of the vehicle. Furthermore, communication stand-by state of the portable device can be changed according the situation. Moreover, approach of the portable device can be detected from a relatively far distance.

According to another aspect of the present invention, a in-vehicle communication system changes the communication stand-by mode of the portable device based on the positional information of the vehicle, in a bi-directional communication in which communication from the on-board terminal to the portable device is inductive communication and communication from the portable device to the on-board terminal is radio communication. Thus, an in-vehicle communication system that can reduce power consumption and detect the approach of the portable device from a relatively far distance according to the situation can be acquired.

According to another aspect of the present invention, the in-vehicle communication system makes preparations for the boarding of the passenger when the passive stand-by mode, in which the portable device transmits the response signal when the response request from the on-board terminal is received, and the active stand-by mode, in which the portable device transmits the notification signal to the on-board terminal at regular intervals, are switched based on the positional information of the vehicle, and the notification signal is received from the portable device. Thus, an in-vehicle communication system that can detect the approach of the passenger at an early stage and perform boarding preparations can be acquired.

According to another aspect of the present invention, the in-vehicle communication system changes the operation modes of the portable device and the on-board terminal including the lock control unit. Thus, an in-vehicle communication system that can change the security state of the vehicle according to the situation can be acquired.

Moreover, an in-vehicle communication system that can notify the portable device of the security state of the vehicle can be acquired. Furthermore, an in-vehicle communication system that performs a special-purpose unlocking operation near the user's home can be acquired. Moreover, an in-vehicle communication system that optimizes the unlocking operation through the approach and boarding histories of the user and prevents needless unlocking can be acquired.

According to another aspect of the present invention, the in-vehicle communication system learns the time, the approach direction, and the user information when the portable device approaches and the passenger does not board the vehicle and makes the unlocking conditions stricter. Thus, an in-vehicle communication system that optimizes the unlocking operation according to the living habits of the passenger can be acquired.

According to another aspect of the present invention, the in-vehicle communication system changes the operation modes of the portable device and the on-board terminal based on the operation state of the engine and the locking status of the door. Thus, an in-vehicle communication system that changes the operation states according to the state of the vehicle can be acquired. Moreover, an in-vehicle communication system that sets the warning operation of the portable device according to the state of the vehicle can be acquired.

According to another aspect of the present invention, the in-vehicle communication system autonomously gives out a warning from the portable device when the response requests from the on-board terminal to the portable device cease while the warning mode of the portable device is set. Thus, an in-vehicle communication system in which the portable device outputs a warning corresponding to the state of the vehicle can be acquired.

According to another aspect of the present invention, the on-board terminal changes the communication stand-by mode of the portable device based on the positional information of the vehicle. Thus, an on-board terminal that changes the communication stand-by mode of the portable device according to the situation can be acquired. Moreover, an on-board terminal that can detect the approach of the portable device from a relatively far distance according to the situation can be acquired.

According to another aspect of the present invention, the on-board terminal sets the warning mode of the portable device based on the operation state of the engine and the locking status of the door. Thus, an on-board terminal that sets the warning operation of the portable device according to the state of the vehicle can be acquired. Moreover, a portable device that can reduce power consumption and automatically give approach-notification to the on-board terminal from a long distance according to the situation can be acquired.

According to another aspect of the present invention, the portable device has a passive stand-by mode, in which the portable device transmits the response signal by radio communication when the response request from the on-board terminal by inductive communication is received, and an active stand-by mode, in which the portable device transmits the notification signal to the on-board terminal at regular intervals by radio communication. Thus, a portable device that can reduce power consumption by standing by for reception by inductive communication and autonomously give approach-notification according to the situation by radio communication can be acquired. Moreover, a portable device that outputs the warning according to the state of the vehicle can be acquired.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle communication system comprising:
   an on-board terminal arranged on a vehicle;
   a portable device that is structured to be inside or outside of the vehicle;
   an information acquiring unit that is structured to acquire vehicle information indicative of a state and a location of the vehicle;
   a location information acquiring unit that is structured to acquire location information indicative of the portable device;
   a pattern recognizing unit that is structured to recognize a movement pattern of the portable device; and
   an operation mode changing unit that is structured to change an operation mode of at least one of the portable device and the on-board terminal based on the vehicle information, the location information and the movement pattern, wherein a communication range from the on-board terminal to the portable device is different from the communication range from the portable device to the on-board terminal, and the operation mode changing unit changes the operation mode based on the movement pattern and whether the portable device is located inside or outside the communication range from the on-board terminal to the portable device.

2. The in-vehicle communication system according to claim 1, wherein the vehicle information includes position information indicative of current position of the vehicle.

3. The in-vehicle communication system according to claim 2, wherein the operation mode changing unit is structured to change a communication stand-by mode of the portable device based on the position information.

4. The in-vehicle communication system according to claim 3, wherein the operation mode changing unit is structured to switch between a passive stand-by mode in which the portable device transmits a response signal when a response request from the on-board terminal is received, and an active stand-by mode in which the portable device transmits a notification signal to the on-board terminal at regular intervals.

5. The in-vehicle communication system according to claim 4, wherein the operation mode changing unit is structured to switch the portable device to the active stand-by mode when the position information indicates that the current position of the vehicle is a store.

6. The in-vehicle communication system according to claim 3, wherein each of the on-board terminal and the portable device includes
   an inductive communication unit structured to cause the on-board terminal and the portable device to communicate with each other based on inductive communication; and
   a radio communication unit structured to cause the on-board terminal and the portable device to communicate with each other based on radio communication.

7. The in-vehicle communication system according to claim 4, wherein the on-board terminal is structured to perform a boarding preparation process of preparing for boarding of a person upon receiving a notification signal from the portable device.

8. The in-vehicle communication system according to claim 6, wherein the on-board terminal is structured to perform a boarding preparation process of preparing for boarding of a person upon receiving a notification signal from the portable device.

9. The in-vehicle communication system according to claim 2, further comprising a lock control unit that is structured to at least one of lock and unlock the vehicle.

10. The in-vehicle communication system according to claim 9, wherein the operation mode changing unit is structured to transition the lock control unit to automatic lock mode based on a distance between the on-board terminal and the portable device and is structured to notify the portable device of the transition in the operation mode.

11. The in-vehicle communication system according to claim 9, wherein the operation mode changing unit is structured to change the unlocking operation mode of the lock control unit when the position information indicates that the current location of the vehicle is the person's home.

12. The in-vehicle communication system according to claim 11, wherein the on-board terminal includes
a portable device detecting unit structured to detect whether the portable device is approaching the vehicle; and
a person detecting unit structured to detect whether a person is onboard the vehicle, and
when the portable device detecting unit detects that the portable device is approaching the vehicle and the person detecting unit detects that a person is not onboard the vehicle, the unlocking operation mode performs a learning process based on information regarding the approach of the portable device and makes the conditions of unlocking stricter.

13. The in-vehicle communication system according to claim 12, wherein the portable device detecting unit is structured to detect whether the portable device is approaching the vehicle based on at least one of current time, approach direction of the portable device, and information related to possessor of the portable device.

14. The in-vehicle communication system according to claim 1, wherein the vehicle information includes at least one of an operation state of an engine of the vehicle and lock status of a door of the vehicle.

15. The in-vehicle communication system according to claim 14, wherein the operation mode changing unit is structured to set a warning mode of the portable device when a driver of the vehicle is detected to have exited the vehicle when at least one of the engine is running and the door lock is released.

16. The in-vehicle communication system according to claim 15, wherein the portable device is structured to give out a warning when response requests from the on-board terminal cease while the warning mode is set.

17. An on-board terminal arranged on a vehicle and that is structured to perform bi-directional communication with a portable device that can be inside or outside of the vehicle, the on-board terminal comprising:
a position information acquisition unit that is structured to acquire position information indicative of current position of the vehicle and the portable device; and
an operation mode changing unit that is structured to change a communication stand-by mode of the portable device based on the position information,
wherein the communication stand-by mode includes a passive stand-by mode in which the portable device transmits a response signal when a response request from the on-board terminal is received, and an active stand-by mode in which the portable device transmits a notification signal to the on-board terminal at regular intervals, and
wherein a communication range from the on-board terminal to the portable device is smaller than the communication range from the portable device to the on-board terminal, and the operation mode changing unit changes the communication stand-by mode to the passive stand-by mode or to the active stand-by mode, based on whether the portable device is located inside or outside the communication range from the on-board terminal to the portable device.

18. The on-board terminal according to claim 17, wherein the operation mode changing unit is structured to switch between the passive stand-by mode and the active stand-by mode.

19. A portable device that can be inside or outside of a vehicle and is structured to perform bi-directional communication with an on-board terminal arranged on the vehicle, the portable device comprising:
a passive stand-by mode unit that is structured to transmit a response signal to the on-board terminal upon receiving a response request from the on-board terminal; and
an active stand-by mode unit that is structured to transmit a notification signal to the on-board terminal at regular intervals, wherein a communication range from the on-board terminal to the portable device is smaller than the communication range from the portable device to the on-board terminal, and a communication stand-by mode is changed to a passive stand-by mode or to an active stand-by mode, based on whether the portable device is located inside or outside the communication range from the on-board terminal to the portable device.

20. The portable device according to claim 19, further comprising:
an inductive communication unit that is structured to transmit signals to the on-board terminal based on inductive communication; and
a radio communication unit that is structured to receive signals from the on-board terminal based on radio communication.

21. A portable device that can be inside or outside of a vehicle and that is structured to perform bi-directional communication with an on-board terminal arranged on the vehicle, the portable device comprising:
a warning mode that is controlled and set by the on-board terminal; and
a warning output unit that is structured to set the warning mode, receive signals from the on-board terminal, and output a warning if no signal is received from the on-board terminal while the warning mode is set, wherein the portable device is in a passive stand-by mode in which the portable device transmits a response signal when a response request from the on-board terminal is received.

22. A method of performing bi-directional communication between an on-board terminal arranged on a vehicle and a portable device that can be inside or outside of the vehicle, the method comprising:
acquiring vehicle information indicative of a state and a location of the vehicle;
acquiring location information indicative of the portable device;
recognizing a movement pattern of the portable device; and
changing an operation mode of at least one of the portable device and the on-board terminal based on the vehicle information, the location information and the movement pattern, wherein a communication range from the on-board terminal to the portable device is different from the communication range from the portable device to the on-board terminal, and the changing includes changing the operation mode based on the movement pattern and whether the portable device is located inside or outside the communication range from the on-board terminal to the portable device.

* * * * *